Patented Mar. 22, 1932

1,850,838

UNITED STATES PATENT OFFICE

PAUL LAEUGER, OF BASEL, SWITZERLAND, ASSIGNOR TO THE FIRM: J. R. GEIGY S. A., OF BASEL, SWITZERLAND

MANUFACTURE OF ACID DYESTUFF OF THE PHENONAPHTHOSAFRANINE SERIES AND THE PRODUCTS

No Drawing. Application filed February 4, 1927, Serial No. 166,021, and in Germany February 13, 1926.

According to the present invention, blue to green-blue acid dyestuffs of the phenonaphthosafranine series which, when dyed, are fully fast to alkali, very fast to light and for the greatest part have good equalizing properties, are obtained by condensing an unsymmetrical N-alkyl-paraphenylenediamine derivative having a sulpho-group in ortho position to the primary amino-group according to the general formula:

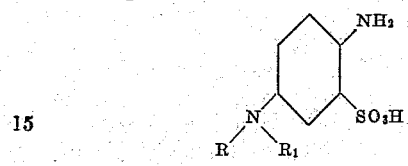

with an isorosinduline sulphonic acid having a sulpho group in position 1 and another in position 6 according to the general formula:

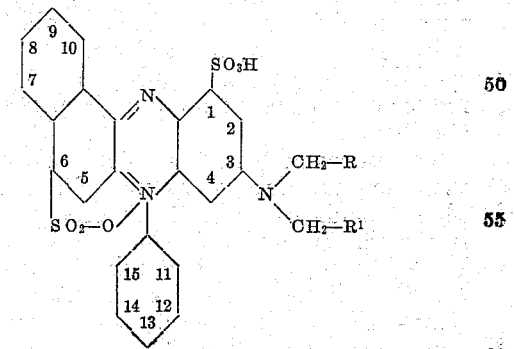

where R and $R^1$ represent hydrogen or alkyl.

The reaction takes place according to the following equation:

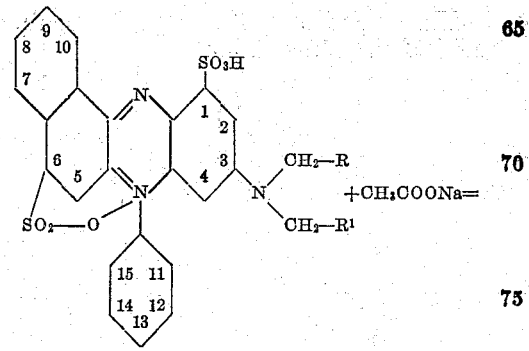

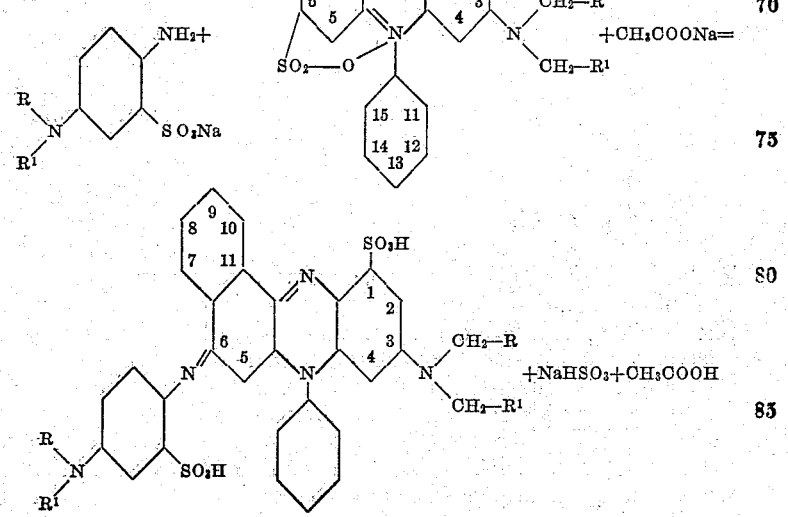

The resulting phenonaphthosafranine sulfonic acids are characterized by the ortho —(16)— position of one sulpho-group to the safranine-nitrogen, which has the effect in general of improving the solubility and the fastness to fulling as well as a marked shifting of the tints toward green-blue. Especially owing to this 16-sulpho-group the dyestuffs are fast to alkali.

The dyestuffs obtained according to this process are soluble in water and in sulphuric acid.

This process of manufacture could not be foreseen, since no similar kind of condensation with ortho-aminoaryl-sulphonic acids has been discovered and the known hindering effect upon the reactions possessed by strong acid radicals in ortho-position to the amino-group did not allow of a prospect of success. When derivatives of para-phenylenediamine are used blue to blue-green dyestuffs of outstanding clearness of tint and pronounced fastness especially to alkali and light are obtained, whereas with the corresponding derivatives of para-aminophenols redder-blue tints of similar properties are obtained.

The isorosinduline-6-sulphonic acids used as parent materials can be made from the sulphonic acids of the neutral blue series by treatment with sulphites in accordance with U. S. Patent 617,703 and subsequent oxidation. Positions 4 and 8 to 15 may contain alkyl-, alkyloxy-, oxy-, carboxy- or acidyl-amino-groups and halogen.

The following examples illustrate the invention, the parts being by weight:—

*Example I*

The phenonaphthosafraninedisulphonic acid of the constitution

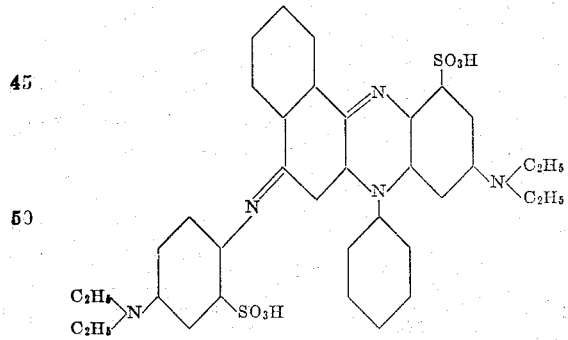

is obtained by converting the isorosinduline-1-sulphonic acid, obtainable by condensing phenyl-2-naphtylamine with an azo dyestuff derived from any diazo compound with 1-diethylamino-3-benzenesulphonic acid into the diethylisorosinduline-1:6-disuplhonic acid (which dissolves in concentrated sulphuric acid to a brownish-red solution and dyes wool muddy blue) according to the process of U. S. Patent 617,703 and 54 parts of this disulphonic acid are stirred for several hours at 90–100° C. in an aqueous solution containing 30 parts of sodium acetate with 25 parts of aminodiethylmetanilic acid in the form of its sodium salt. The dyestuff separates in crystalline needles of coppery appearance; when salted out from the boiling solution it forms a resinous cake of bronze appearance which becomes solid on cooling. In concentrated sulphuric acid the dyestuff shows a grass-green reaction. In a sulphuric acid bath it dyes good equalizing blue tints of pronounced fastness to light and alkali.

*Example II*

A phenonaphthosafraninetrisulphonic acid of the formula

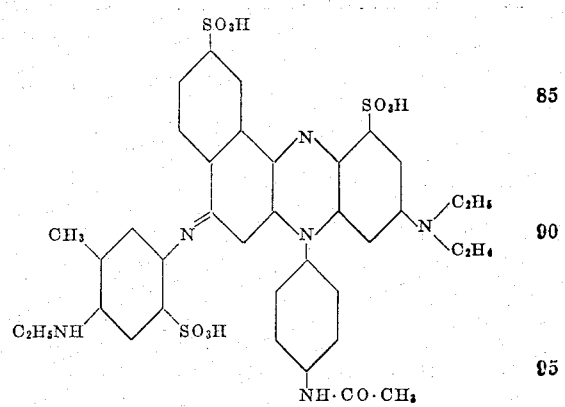

is obtained by dissolving in 1200 parts of water 35.6 parts of para-acetylaminophenyl-2-naphthylamine-7-sulphonic acid (made from 2-naphthol-7-sulphonic acid + para-phenylenediamine by means of bisulphite, and acetylating the sparingly soluble acid to convert it into a more freely soluble acid) and 24.4 parts of amino-diethylmetanilic acid in the form of their sodium salts, adding 55 parts of acetic acid of 80 per cent. strength and dropping into the mixture at 80° C. in the course of an hour an aqueous solution of 31 parts of sodium bichromate. The temperature is maintained for some time and the dyestuff is then salted out, whereby it is obtained in the form of copper-red crystals. By washing it with salt solution it is freed from chromium acetate and is then boiled with 100 parts of bisulphite for several hours. The boiling liquid is then acidified, the sulphur dioxide expelled and a current of air blown through the liquid at 60–80° C. For the condensation an aqueous solution of 23 parts of para-aminomonoethyl-ortho-toluidine-meta-sulphonic acid in the theoretical quantity of sodium carbonate is boiled with the solution of the exactly neutralized isorosinduline-tri-sulphonic acid until the brown yellow reaction with sulphuric acid becomes of a violet colour. The dyestuff crystallizes after addition of common salt in beautiful crystals of brassy or coppery lustre.

It dyes animal fibre in beautiful green blue tints, fast to alkali and light.

What I claim is:—

1. A process for the manufacture of equalizing acid dyestuffs of the phenonaphthosafranine series fast to alkali, consisting in condensing an unsymmetrical N-alkyl-para-phenylenediamine derivative having a sulpho-group in ortho position to the primary amino-group according to the general formula

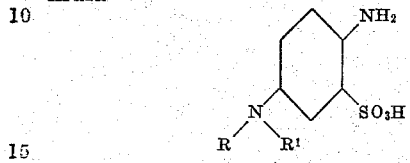

with an isorosinduline-sulphonic acid having a sulpho-group in position 1 and another in position 6, according to the general formula:

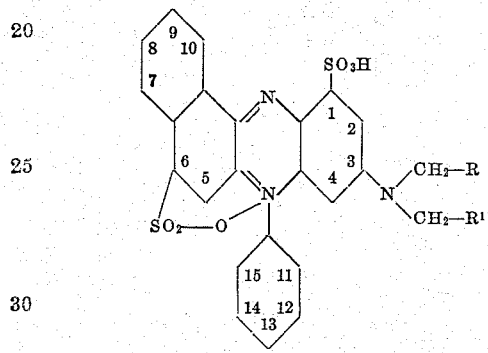

where R and R¹ represent hydrogen or alkyl.

2. A process for the manufacture of equalizing acid dyestuffs of the phenonaphthosafranine series fast to alkali, consisting in condensing an unsymmetrical N-alkyl-para-phenylenediamine derivative having a sulpho-group in ortho position to the primary amino-group according to the general formula:

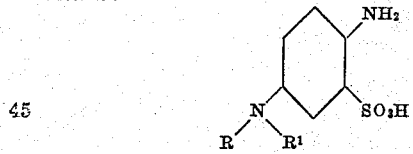

with an isorosinduline sulphonic acid having a sulpho-group in position 1, another in position 6 and a third in any other position, according to the general formula:

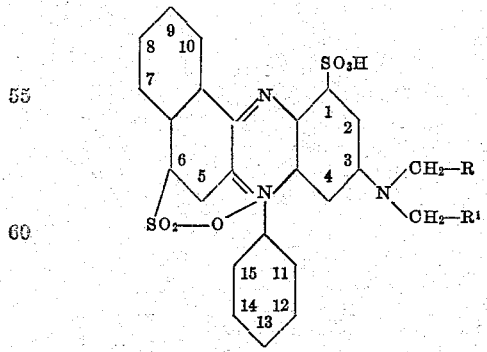

where R and R¹ represent hydrogen or alkyl.

3. As new articles of manufacture the herein described dyestuffs of the phenonaphthosafranine series obtained by condensing an isorosinduline sulphonic acid having at least two sulpho-groups with an unsymmetrical N-alkyl-para-phenylenediamine derivative having a sulpho-group in ortho position to the primary amino group, and constituted according to the formula:

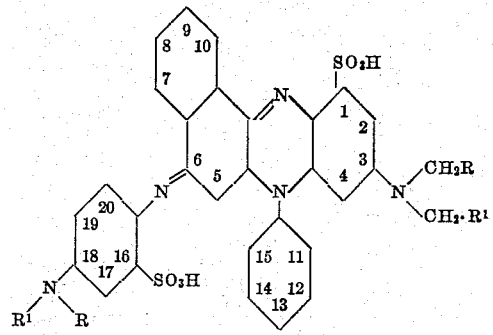

where R and R¹ represent hydrogen or alkyl, said dyestuffs constituting dark powders soluble in water with reddish blue to greenish blue coloration, dissolving in sulphuric acid with a green to violet color and yielding on the animal fibres blue to greenish blue tints fast to alkali and light.

In witness whereof I have hereunto signed my name this 20th day of January, 1927.

PAUL LAEUGER.